Sheet 1. 4 Sheets.
Whiteley & Fassler.
Harvester-Rake.
Nº 74465.          Patented Feb. 11, 1868.
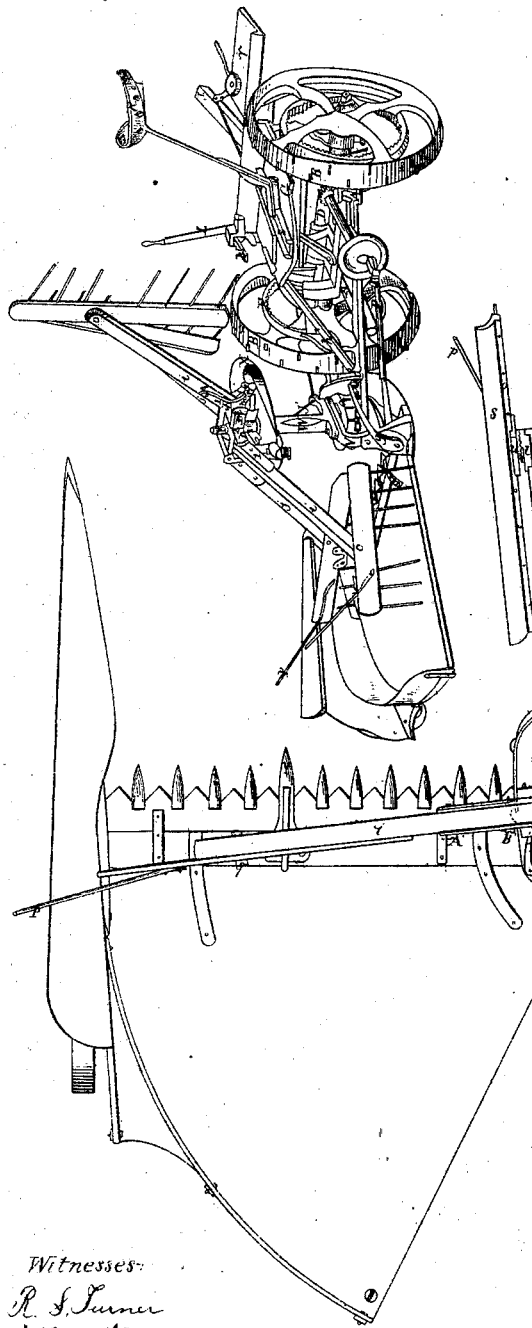
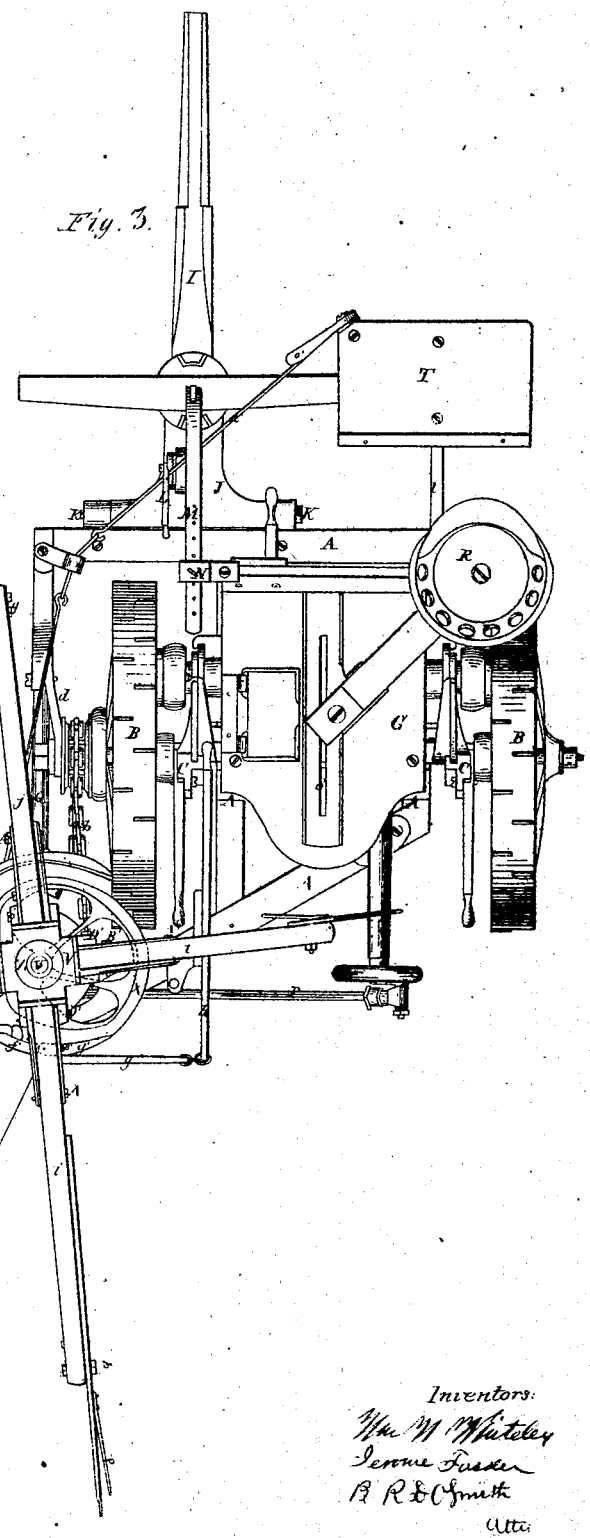

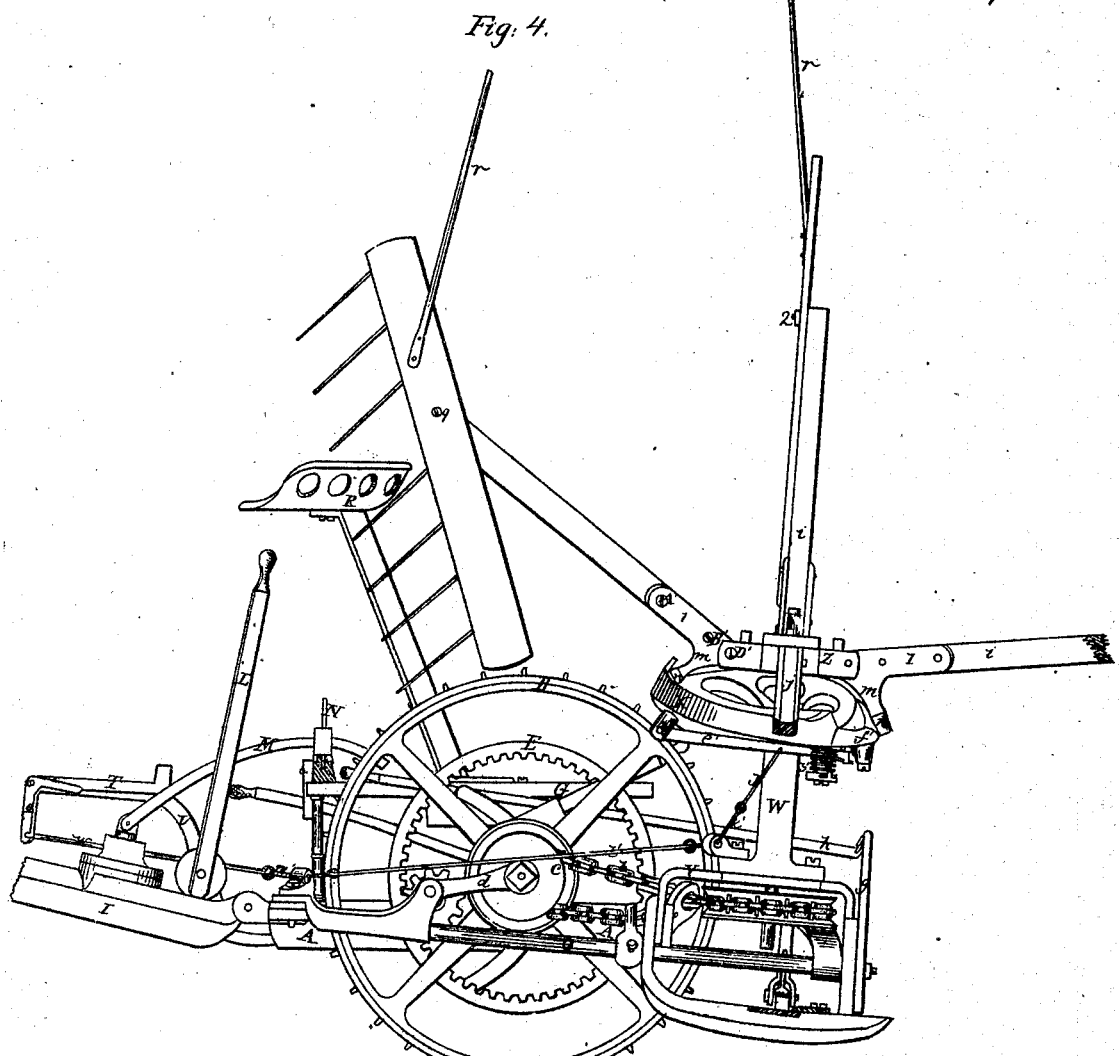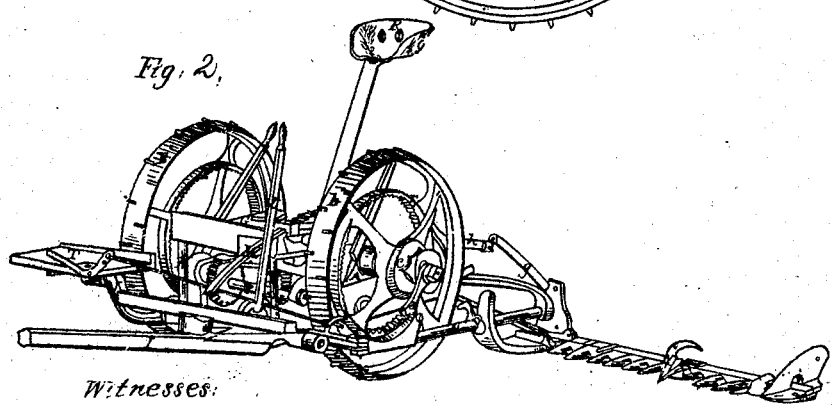

Whiteley & Fassler
Harvester-Rake.
N° 74465  Patented Feb 11, 1868

Witnesses:
R. S. Turner
D. B. ventre

Inventors:
Wm N. Whiteley
Jerome Fassler
By R. D. O. Smith Atty

Sheet 4. 4 Sheets.

Whiteley & Fassler.
Harvester-Rake.

N° 74465.        Patented Feb. 11, 1868.

Witnesses
R. S. Turner
L. B. ventres

Inventors:
Wm W. Whiteley
Jerome Fassler
By R. D. Smith Atty

UNITED STATES PATENT OFFICE.

WILLIAM N. WHITELEY AND JEROME FASSLER, OF SPRINGFIELD, OHIO.

IMPROVEMENT IN HARVESTER-RAKES.

Specification forming part of Letters Patent No. 74,465, dated February 11, 1868.

*To all whom it may concern:*

Be it known that we, WILLIAM N. WHITELEY and JEROME FASSLER, of Springfield, in the county of Clarke and State of Ohio, have invented a new and useful Improvement in Harvesters; and we do hereby declare the following to be a full, clear, and exact description of the same, reference being had to the accompanying drawings, in which—

Figure 10:
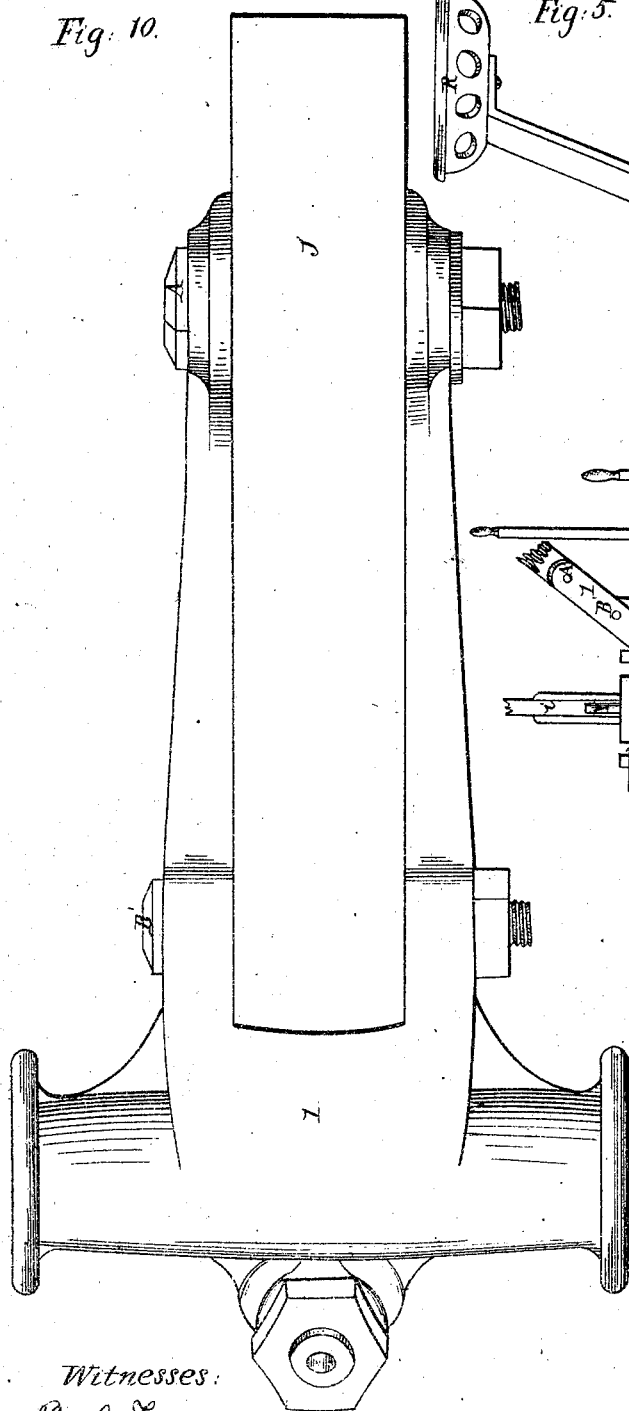
Figure 5:
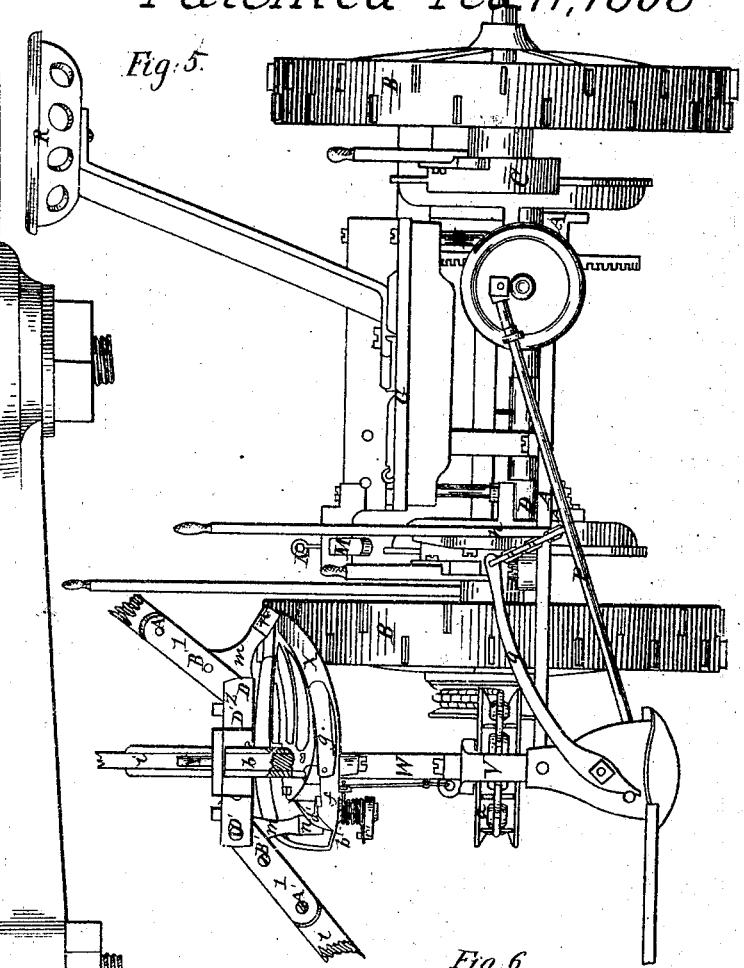
Figure 6:
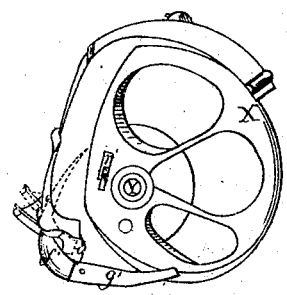
Figure 8:
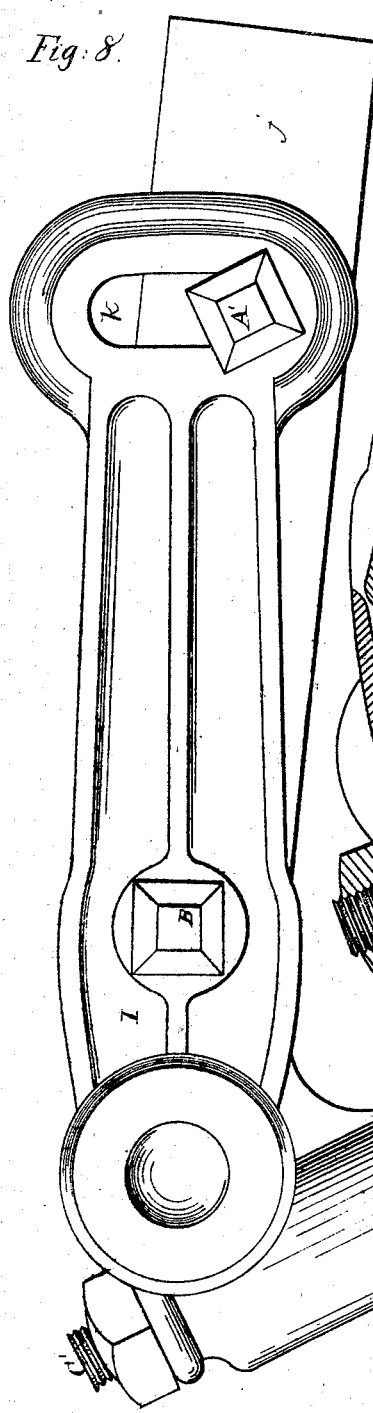
Figure 9:
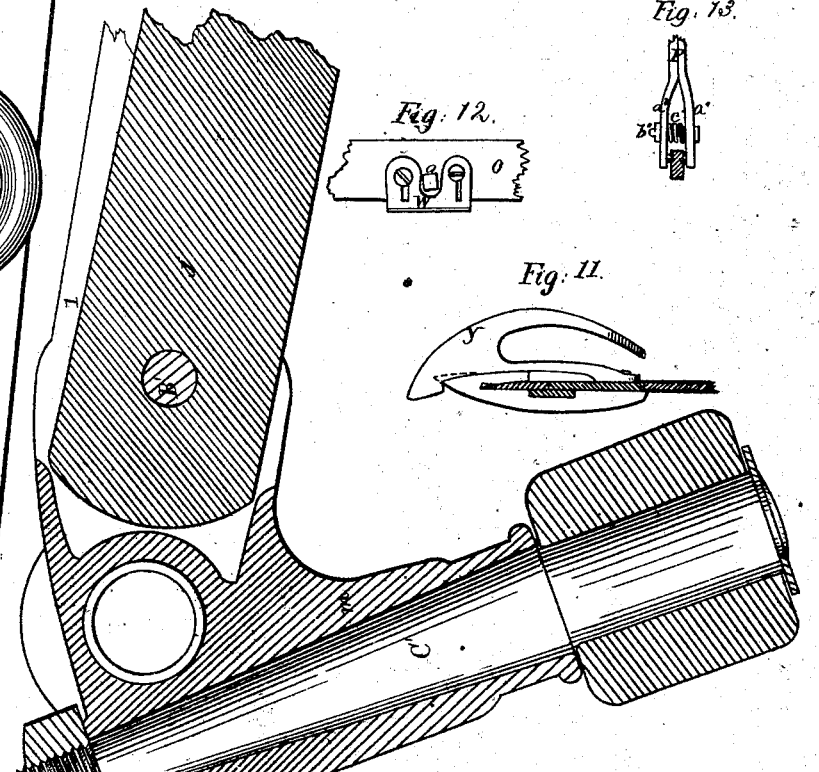
Figure 12:
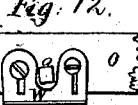
Figure 11:
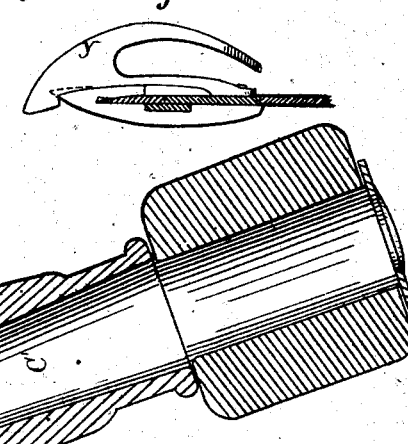
Figure 7:
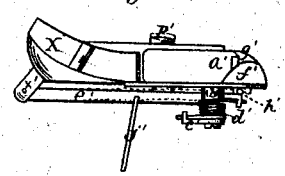

Figure 1 shows a perspective view of our machine seen from the rear; Fig. 2, a similar view seen from the front; Fig. 3, a plan view of our machine; Fig. 4, a side elevation of the same; Fig. 5, a rear elevation; Fig. 6, a plan view of the rake and reel's guide-frame; Fig. 7, a side elevation of the same; Fig. 8, a side elevation of the rake-arm head and traveler; Fig. 9, a sectional view of the same; Fig. 10, a plan view of the same; Fig. 11, a side elevation of the guard $y$; Fig. 12, a view of the guard $w$; and Fig. 13, a plan view of the heel of the pitman.

The nature of our invention will be understood by reference to the following description:

A A are the parts of the main frame, which is composed of iron, the side pieces being rolled in the form of angle-iron, and the transverse pieces being flat bars, and the whole firmly secured together by bolts, rivets, or other proper means. This form and construction of frame is not new in this application, having been shown and described heretofore in Letters Patent granted to William N. Whiteley.

B B' are the driving-wheels, mounted on short axles projecting from the rear ends of the coupling-arms $c\,c$. The main pinion-shaft D is mounted in boxes secured to the side bars of the main frame. The driving-wheels B B are provided with internal gear-wheels E E, which mesh with the teeth of the pinions F F, and thereby communicate their motion to the operative mechanism of the machine.

The driver's foot-board G is mounted upon short posts H H, the lower ends of which rest upon the main frame, and the tongue I is secured to the draft-plate J in the usual manner, and said plate is hinged to the main frame by the joint-bolt K, which passes through portions of said plate, and through lugs projecting from the front bar of the main frame. The tongue is controlled by the lever L, and may be made rigid at any point by means of the brace M and pin N. Motion is communicated to the cutters by means of the crank-shaft O, pitman P, and a bevel-driver located on the main pinion-shaft. The rear transverse bar of the main frame is oblique to the side bars, and that end which is toward the cutting apparatus is considerably extended, and bent downward, so as to permit the rear end of the dray-bar Q to pass through it, as shown in Figs. 2 and 4. The dray-bar Q is attached, at its forward end, to the front bar of the main frame, and at its rear end it passes through lugs projecting upward from the inner shoe, and also through the extended end of the rear cross-bar of the main frame. The inner shoe is thereby flexibly connected to the main frame, and at the same time its relative position thereto is permanently fixed. The cutting apparatus is of the sort commonly employed—*i. e.*, having a short cutter, narrow divider, open guard-fingers, and reciprocating scalloped cutters.

Thus far in this description it refers to methods of construction which are common and well known.

The driver's seat R is mounted on a spring-leg, which is secured to the foot-board G by a screw, which passes through a long slot, S, and into a nut on the lower side, so that by loosening said screw the seat may be moved forward or backward, as desired, to enable the weight of the driver to balance the weight of the rear portions of the machine. The leg of the seat may also be reversed, so as to bring the seat over the rear edge of the machine, as it is necessary to do when the platform and reel are removed to convert the machine into a mower. When the machine is fitted as a reaper, it is desirable to arrange the driver's seat as far toward the outside of the machine, away from the cutting apparatus, as possible, for the reason that this weight will then tend to relieve the side draft of the machine, and he will be removed from the track of the reel, and therefore in less danger of being struck as it revolves. The guide-plate, in which is the slot S, is therefore provided with an offset, which permits the leg of the seat to be placed in a position diagonal to the sides of the machine, as shown in Figs. 1 and 3, and the driver's weight is thereby located over the outer driving-wheel; and to accommodate his feet when the seat is in this position, the foot-board T is mounted at the end of an arm, U, which projects from the main frame forward for that purpose.

The rake and reel are mounted on the inner shoe in the manner as follows: The bridge V is secured to the upturned ends of the shoe, or to lugs cast thereon for the purpose, by screw-bolts or other convenient fastenings. Upon the top of this bridge is mounted the hollow shaft W, which bears at its upper end the rake-guard and guide X. The rake and reel shaft Y passes through the hollow shaft W, and to its upper end is secured the rake-head Z, and to its lower end the sprocket-wheel $a$. A chain, $b$, passes around said sprocket-wheel and around a corresponding sprocket-wheel, $c$, mounted on the inner end of the shaft or axle of the inner driving-wheel, by which arrangement the motion of the driving-wheel is communicated to the rake and reel. If no means were adopted to counteract the strain thus brought upon the outer end of the main axle, it might interfere with the correct and easy working of the machine, and we have therefore employed the brace $d$, which is pivoted to some portion of the main frame opposite the axis of the main pinion-shaft, so that as the driving-wheel is moved up or down, as respects the main frame, to adjust the latter at its proper height from the ground, the brace $d$ moves on a center coincident with the axis upon which the driving-wheel moves, and the function of the brace $d$ is therefore unchanged by the change of position of the driving-wheel. In order to prevent any possibility of cramping during changes of relative position of the main frame and the reel and rake, the driving-chain $b$ is left somewhat slack on the pulleys, and is prevented from slipping by sprockets, which catch each alternate link of the chain, and to insure a proper lead the guides $e$ are secured to the reel-frame or some other proper part of the apparatus connected with the shoe.

The levers $g$ $h$ enable the attendant to raise the outer end of the cutting apparatus whenever necessary to clear a stone or other obstruction in the road of the machine. This is chiefly necessary when the machine is being used as a mower.

The reel and rake head Z is provided with lugs projecting horizontally in four directions, to admit the use of four reel-arms, one of which acts also as a rake to sweep the grain from the platform. Each reel-arm $i$ and the reel and rake arm $j$ are secured in a cast-iron head, $l$, the form of which is shown in Figs. 4, 8, 9, and 10. A slot, $k$, in the outer end of each branch of the head $l$, receives the clamping-bolt A', and permits the arm $j$ to be raised or lowered, and adjusted at any point desired to give the rake or reel blade the proper elevation from the cutting apparatus and platform as it revolves over them, the inner end of the arm $j$ being secured by the joint-bolt B'. At the inner end of each head I is a pendent stud, $m$, and through this stud, in the direction of its axis, is a conical hole adapted to receive the conical bolt $c'$, which is secured in its place by a screw-nut at its smaller end, which securely clamps it in its seat. The lower end of the bolt $c'$ is made cylindrical to serve as a bearing or axle for the traveler-roller $n$, which traverses the guide X, and causes the rake or reel alternately to rise into the air to clear the frame of the machine, &c., and to fall again and travel over the platform as it revolves.

The traveler-roller $n$ is cast in a chill, and with a chill-bolt to form the bearing for the journal at the lower end of the bolt $c'$. By this means the friction-surfaces of this roller are made very hard, and will not wear away for a long time, even though they should not be oiled. The journal on which the roller $n$ revolves should be made very hard, either by casting in a chill matrix, or by making it of steel and tempering it hard. The head $l$ is pivoted to the reel-head Z by the joint-bolt D', which is inserted through the head L, and through one of the lugs on either side of it.

The rake-guide X consists of a frame having a rim, which is equidistant all around from a circle, which cuts through all of the joint-bolts D', and forms their orbit of revolution. The said rim is nearly or quite horizontal at that portion which is over or toward the platform, and rises from the horizontal at that portion which is toward the main frame, so that as the reel or rake arm traverses the guide X, it is pushed upward as it passes from over the rear of the platform, and becomes nearly vertical as it passes over the main frame and driver's seat, and then descends again, and passes over the platform at a uniform distance therefrom.

It is frequently desirable and necessary to prevent the removal of the gavel at every revolution of the rake, for the reason that the grain may stand too thin to accumulate in sufficient quantities upon the platform during one revolution of the rake. It is therefore necessary to enable the attendant to cause the rake-arm $j$ to rise higher than the track of the reel-arms $i$, when said rake-arm is passing through that portion of its course which is over the platform, to the end that the teeth of the rake O shall not engage with the grain on the platform, but pass over it, and during that stroke only act as a reel-blade to press the standing grain toward the cutters. This end we effect by interposing a switch in the guide X, over which the roller $n$ on the rake-arm $j$ is caused to pass when it is desired that the rake shall not operate.

This switch $a'$, Figs. 6 and 7, has a pin at its angle, and secured to its lower part, which passes downward through the box $b'$ on the lower side of the guide-frame, and to the end of this pin or bolt is secured the arm $c'$. On the outer surface of the box $b'$ is a spring, $d'$, coiled, one end of which presses against the arm $c'$, while the other extends under the horizontal part of the frame X, and is held by one end of the stop-lever $e'$. This spring throws the switch $a'$ open whenever released, so that the next roller $n$, in passing around the guide X, will enter inside said switch. But the switch is so made that, as the roller $n$ passes inside of it, said roller comes in contact with the rear end of the switch and forces it outward and the forward end inward, so that the next succeeding roller $n$ will strike on the outside of the said switch, and be carried on the guideway formed by the switch and pieces $f'$ and $g'$. Before the roller $n$ has reached the outer angle of the switch the spring $d'$ throws the forward end of the stop-lever $e'$ upward behind the pin $h'$, and holds the switch closed until the driver releases it by placing his foot upon the lever $o'$, and drawing the stop-lever $e'$ downward from behind the pin $h'$, when the spring $d'$ throws the switch open, and the next succeeding traveler-roller passes behind it, its rake descends upon the platform and sweeps the grain therefrom, and the switch is reclosed until such time as the driver desires the grain raked from the platform again. If the grain should be very thick, the driver may keep the stop-lever permanently depressed, so that each alternate reel-blade will descend upon the platform, the switch being opened and closed automatically by the spring $d'$ and each alternate roller as it passes behind it. The spring $d'$ is made to operate both switch and stop-lever by connecting one of its ends to the arm $c'$ and the other to the stop-lever, in the manner shown. The piece $g'$ is pivoted at the end next to the piece $f'$, and the other end is free to move as the rollers $n$ $n$ pass outside or inside. The lever $e'$ is pivoted at $x'$ on the forward side of the guideway X, and has a connection, by means of the rod $j'$, cord $k'$, rod $l'$, cord $m'$, and rod $n'$, with the crooked lever $o'$ attached to the inner forward corner of the driver's foot-board T. By this connection the movements of the reels and rakes are at all times under the control of the driver. By pressing the foot on the lever $o'$, the lever $e'$ is depressed and the switch $a'$ free to move, and the arms act alternately as rake and reel. On releasing the lever $o'$, the lever $e'$ catches and retains the switch, so that the rollers $n$ $n$ pass outside of it, and all the arms act as reels. The lever $e'$ has a latch, $p'$, on its upper edge, which passes up through the slot $r'$ in the guide-frame X, so that it may not be pulled down by the driver only just far enough to release the pin $h'$, and thus allow the switch $a'$ to be turned as each roller $n$ of the arms comes in contact with the ends of said switch.

The reel-blades as well as the rake-head are provided with teeth, so that in case of necessity either one of the reel-blades may be used as a rake by adjusting its arm by means of the slot $k$. A guard, $p$, projecting laterally from the forward side of the reel or rake blade near its outer end, serves to prevent any grain within reach of said blade from being thrust beyond its end, and thus escape being pressed toward the cutters. The reel-blades are secured to the reel-arms by screw-bolts $q$, which pass through both blade and arm, and permit a limited angular adjustment of the blade in reference to the arm.

The rake-head $o$ is constructed with a curved flange or guard, $s$, which is set upon its forward edge, and curves forward, as shown. This guard is sufficiently wide to prevent the grain from riding over the upper edge of the rake-head when the gavel is heavy, and it is set sufficiently far forward to permit the sockets for the rake-teeth to come up behind it, as shown in Fig. 3, so that the shank of a broken tooth may be exposed at its upper end, and backed out of its socket without trouble. The rake-head $r$ is secured to the rake-arm $j$ by means of a joint-bolt, which passes through both arm and head, and also through the serrated plates $t$ $u$, one of which is attached to either part, and, when the joint-bolt is tightened up, prevents any movement of the rake-head in respect to the rake-arm, and when said joint-bolt is loosened the rake-head may be the proper angle to its arm. The shaft Y of the rake and reel is set nearly as far forward as the points of the cutters, and the rake therefore strikes into the grain very far forward as it descends toward the platform, and, unless provided with a guard, it might sometimes strike into the cutting apparatus and damage the cutters. To prevent such a contingency, an adjustable guard-plate, $w$, is attached by screws to the rake-head, and a guard, $y$, is placed over one of the guard-fingers, as shown in Figs. 3 and 11. Upon this guard $y$ the guard-plate $w$ will strike, if for any reason the rake descends too low in its revolution, and the rake will be carried high enough to clear the cutters, and will strike upon the platform immediately back of the cutter-bar. The guard $y$ is shaped so as to fit over one of the guard-fingers, and it has a socket at its forward end, into which the point of the guard-finger enters to hold that portion of the guard in place, while the rear portion is secured to the finger-bar by one or more screws, as shown. In order to make this guard as light as possible, its back is formed with a curved spire rising from its forward end, and passing over toward its rear end, as shown in elevation in Fig. 11; or it may be constructed with a rib or ridge of proper height and form.

In order that when the machine is backed the rakes and reels will not be caused to revolve by the reverse motion of the driving-wheels, I place a ratchet-wheel, $w'$, on the inner face of the sprocket-wheel $c$, in the teeth of which a catch is pressed by a spring in the ordinary manner, so that the sprocket-wheel remains stationary on the shaft of the driving-wheel when said driving-wheel is turned backward.

Figure 13:

The pitman P, at its joint with the heel of the cutter-bar, is forked, so as to embrace said heel between its parts, as shown in Fig. 13. The joint is formed by conical or conoidal points, attached either to the heel or to the pitman, projecting into corresponding sockets in the opposite parts. The parts $a'' a''$ of the pitman are drawn together to tighten the joint by means of the screw-bolt $b''$, which passes through both of said parts just back of the joint, and to keep a constant pressure upon said screw-bolt, as well as to perfectly control the parts $a'' a''$, the strong spiral spring $c''$ is placed around said bolt between the parts $a'' a''$. Said spring constantly presses the parts $a'' a''$ away from each other.

Having thus described our invention, what we claim as new is—

1. The pivoted brace $d$, one of its ends moving on a center which is coincident with the axis of the main pinion-shaft, and its other end moving on the axis of the main driving-wheel, as and for the purpose set forth.

2. In combination with the guide-frame X, the guide-switch $a'$, constructed to open automatically when released from its stop $e'$, and to be closed again by the passage of the traveler on the rake or reel arm next succeeding, substantially as and for the purpose described.

3. In combination with the guide-switch $a'$, pin $h'$, and the stop-latch $e'$, constructed and operated substantially as described.

4. In combination with the guide-switch $a'$ and stop-latch $e'$, the spiral spring $d'$, arranged as shown and described, so that the same spring acts against both the switch $a'$ and latch $e'$, as set forth.

5. The rake-head $o$, constructed so that the upper ends of the shanks of the teeth are exposed, and provided with the curved rim or flange $s$, as and for the purpose described.

6. The adjustable guard $w$, placed upon the rake-head, substantially as shown, and for the purpose set forth.

7. The guard $y$, placed upon the finger-bar, substantially as and for the purpose set forth, in combination with the forked pitman $p$, provided with conical or conoidal journals, as described, and the spiral spring $c''$, for the purpose set forth.

8. The seat-slide S, constructed with the offset, so that the seat may be placed over the center of the platform, or may be placed at one side of the same, to counterbalance the weight of the rake, as set forth and described.

WM. N. WHITELEY.
JEROME FASSLER.

Witnesses:
THOMAS J. PRINGLE,
GEO. W. BURNS.